Sept. 10, 1940.　　　A. G. HILLMAN　　　2,214,022

CAMERA FOR PHOTOGRAPHY OR CINEMATOGRAPHY IN COLORS

Filed Sept. 4, 1937

INVENTOR
Albert George Hillman
BY
Albert F. Nathan
ATTORNEY.

Patented Sept. 10, 1940

2,214,022

UNITED STATES PATENT OFFICE 2,214,022

CAMERA FOR PHOTOGRAPHY OR CINEMATOGRAPHY IN COLORS

Albert George Hillman, Maidenhead, England

Application September 4, 1937, Serial No. 162,456
In Great Britain September 9, 1936

2 Claims. (Cl. 95—2)

The present invention relates to cinematograph cameras and particularly to cameras wherein monochrome renderings by color selection are obtained by the use of suitable color filters.

The character of the color filters used depends on the conditions under which the images are to be taken. For example it will be generally found that filters which are suitable for daylight will not be so satisfactory where the images are taken by white arc-light, or by the light of half watt lamps in which light there is usually a preponderance of red actinic rays, or by mixtures of arc and half watt light. Moreover the filters best suitable for full mid-day-light are too dense and otherwise unsuitable for morning or evening light.

When light dividing systems are employed for dividing a main beam into a plurality of image-forming beams and the system is designed to give a predetermined apportionment of light to the respective filters, better results can be obtained when changing over from say full daylight to half watt light by the reversing of filters, in the case of three color processes, reversing the green and blue filters. This reversal is convenient when in the production of cinematographic effects in color part of the film is made out of doors and part indoors. The reversal should be effected not by changing the position of the filters in relation to the film, but by a change in position of the optical system such as shall maintain the same sequence of the color records along the film. In addition the red filter may be made slightly denser. However, it is generally desirable that a denser red filter should then be used and as well as changing the position of the optical system it may be desirable to change over to another group of filters in which not only is the red filter denser but also a denser green filter and a lighter blue filter are present.

The main object of the present invention is to simplify the change over from one group or set of filters to another, and accordingly the invention broadly consists in accommodating in the camera one or more reserve filters or sets of filters and in providing means whereby interchangeability of the filters is permitted under the control of a remotely operated actuating device, preferably externally of the camera.

Thus two or more sets of filters may be brought into operative position alternately, or by selection, very rapidly and easily by actuating the external control.

Figure 1:
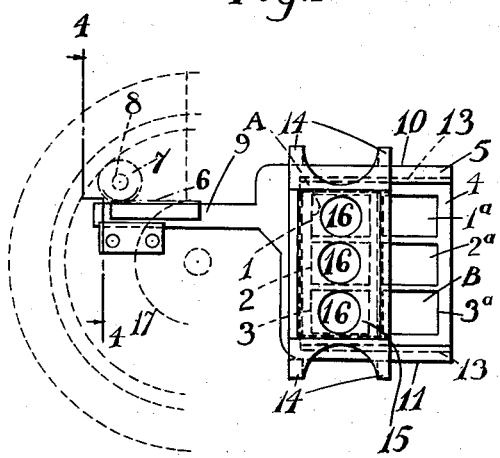
Figure 2:
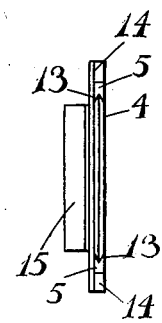
Figure 3:
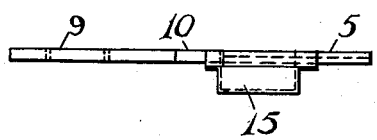
Figure 4:
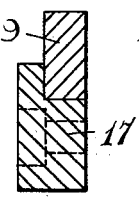
Figure 5:
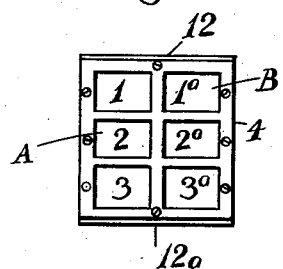
Figure 6:
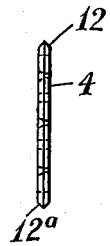

The accompanying drawing illustrates a rectilinearly sliding form of carrier, Fig. 1 being a front view, Fig. 2 an end view and Fig. 3 a plan view of the device, whilst Fig. 4 is an enlarged cross sectional view on the line 4—4 of Fig. 1. Figs. 5 and 6 are front and side views respectively of a pair of filter sets in a frame which is slidable into the carrier.

In the form illustrated the invention is applied to a three color camera. Two sets of filters A, B, each consisting of three individual filters 1, 2, 3, 1a, 2a, 3a, are in a slide 4 which is slidden into a carrier 5 which is guided for sliding movement to and fro by rack and pinion mechanism 6, 7, the rack 6 conveniently being a fixed part of the carrier and the pinion 7 being carried by a spindle 8 which passes through the camera casing and terminates in an actuating knob.

The carrier may be a U-shaped member having a tail piece 9 carrying the rack, the limbs 10, 11 of the U being appropriately formed to receive and guide the slide carrying the filter sets.

In this example the opposite edges 12, 12a of the slide are bevelled to a V form and the limbs of the U are formed with counter part grooves 13.

The filter slide may be locked in position by one or more set screws. In this form it carries two vertical rows of filters, one row being applicable to full daylight use and another for taking in evening and morning light. For outdoor taking it is therefore easy to switch over from one row to another. Whilst it is possible to have one or more further rows such as for arc-light or half-watt light use, it is difficult to provide therefor within the compass of the modern cinematograph camera, but as the filter slide 4 is removable the one for outdoor use can be readily replaced by another similarly slidable into the carrier 5 and having sets of filters applicable for different indoor lights.

The slide-carrier 5 can be slide-guided between corner projections 14 on a light-shielding box 15 disposed between the filters, which are generally placed as near to the focal plane as possible, and the shutter, the latter being brought as near as possible to the box and between the box and the lenses. The box is divided into compartments and each compartment provided with an aperture 16 through which light from a lens is transmitted to the corresponding filter. The light from the respective lenses is thereby confined to the appropriate filter. A further guide or thrust block 17, arranged opposite to the pinion 7, may be provided for the tail piece 9 of the carrier.

What I claim is:—

1. A cinematograph camera for use in producing films containing recurring groups of color constituent images in connection with cinematography in colors, comprising in combination a plurality of image-exposing apertures, a plurality of sets of color filters, one of said sets comprising a plurality of primary color filters corresponding in number to the plurality of apertures and arranged to cooperate with said apertures and another of said sets containing a corresponding number of color filters of different shades of the colors of the first set, said color filter sets being predetermined for photographing in different lights, a slide carrying said filters, a frame in which said slide is slidable and from which said slide is removable, said frame being in the form of a U-structure comprising a rearward tail piece, said tail piece having a rack, a pinion engaged with said rack, a shaft carrying said pinion and extending to a part for manual control, guides between which the limbs of said U-structure are slidably guided for sliding movement in either direction, the opposite inner faces of the limbs of said U-structure acting as the guides for said slides, the manual rotation of said shaft displacing said frame and said filter as a unit laterally of the exposure apertures and permitting any set of said filters to be brought at will into registration with said exposure apertures.

2. A camera as in claim 1, comprising a light-tight box, partitions dividing said box into compartments, each compartment having one of said exposure apertures, and guide members for said U-structure carried by one wall of said box.

ALBERT GEORGE HILLMAN.